United States Patent
Ryan et al.

(10) Patent No.: US 9,411,623 B1
(45) Date of Patent: Aug. 9, 2016

(54) STORAGE PERFORMANCE BY HEURISTICALLY COALESCING IO REQUESTS

(71) Applicant: VMware, Inc., Palo Alto, CA (US)

(72) Inventors: Nicholas Michael Ryan, Palo Alto, CA (US); Krishna Yadappanavar, Sunnyvale, CA (US); Prasanna Aithal, Palo Alto, CA (US); Sunil Satnur, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 636 days.

(21) Appl. No.: 13/849,249

(22) Filed: Mar. 22, 2013

(51) Int. Cl.
*G06F 9/455* (2006.01)
(52) U.S. Cl.
CPC .................................. *G06F 9/4555* (2013.01)
(58) Field of Classification Search
None
See application file for complete search history.

(56) References Cited

U.S. PATENT DOCUMENTS

2011/0119679 A1* 5/2011 Muppirala ............ G06F 3/0611
   718/105
2012/0173778 A1* 7/2012 Povaliaev ............ G06F 3/0659
   710/68

* cited by examiner

*Primary Examiner* — Gregory A Kessler

(57) ABSTRACT

A method for coalescing IO requests includes maintaining a queue in a layer of an IO stack of a hypervisor, wherein (i) the queue holds IO requests received from an upper layer of the IO stack without forwarding the IO requests down the IO stack, and (ii) the layer of the IO stack resides above a file system layer of the IO stack. The method further includes receiving, at the layer, an IO request from the upper layer or a notification of a completion of certain IO requests previously transmitted by the layer down the IO stack. The method further includes determining whether any IO requests currently held in the queue should be transmitted down the IO stack based upon a condition; and combining any IO requests in the queue into at least one combined IO request to transmit down the IO stack if the condition is satisfied.

20 Claims, 3 Drawing Sheets

STORAGE PERFORMANCE BY HEURISTICALLY COALESCING IO REQUESTS

BACKGROUND

Computer virtualization is a technique that involves encapsulating a physical computing machine platform into a virtual machine (VM) that executes under the control of virtualization software on a hardware computing platform or a "host." The VM has both virtual hardware and a "guest" operating system (OS). The virtual hardware of a VM typically includes a least one "virtual disk," that is generally stored on the host platform or on a remote networked storage device as a single file or a set of files (referred to herein as a "virtual disk file"). Although stored as a file or set of files, the virtual disk appears as a typical physical storage drive to the guest OS and, from the perspective of the guest OS, operates in a similar manner to such typical physical storage drives, storing the guest OS, application programs, application data and the like.

The virtualization software, also generally referred to as a "hypervisor," manages the guest OS's access to the virtual disk and maps the virtual disk to the underlying physical storage resources that reside on the host platform or in a remote networked storage device, such as a storage area network (SAN) or network attached storage (NAS). In particular, the hypervisor may include or otherwise interact with a file system (sometimes referred to as a "virtual machine file system") that manages how virtual disk files are stored in the underlying physical storage. In some implementations, this virtual machine file system is one of a number of software layers in the hypervisor (sometimes referred to as an "IO stack") that ensure that IO requests issued by applications in the VM to the virtual disk ultimately reach the physical storage system that stores the virtual disk file or files. The top layer of the IO stack for example, generally receives an IO request, which includes the specific read and write requests generated by an application in the VM, when the IO request is passed by the guest OS to the VM's virtual hardware (e.g., as a SCSI read or write block request to a virtual host bus adapter of the VM, for example) and into the hypervisor. Each layer of the IO stack receives the IO request in a form that may have been transformed by the previous layer and may perform its own transformation on the IO request as well as other related operations in order to correctly route the IO request to the appropriate virtual disk file and location therein.

Due to the complexities of virtualization, layers of an IO stack may need to execute additional IO operations in order to properly perform the actual read or write IO request that has been originally issued from an application in the VM. For example, a layer in the IO stack, upon receiving an IO request from an upper layer, may transform the IO request by actually splitting the IO request into multiple further IO requests to be further passed down the IO stack. A layer in the IO stack may split an IO request, for example, because the particular virtual disk may actually comprise a set of files that each may need to be examined to determine which of the files actually stores the data relevant to the IO request. A virtual disk comprising multiple files may, for example, share a read-only base, parent or golden master virtual disk file with a number of other virtual disks and further comprise an additional "delta disk" file to store any additional data or modifications that differ from the contents of the base virtual disk file. In order to find data in the virtual disk, a particular layer of the IO stack may need to check for the presence of the data first in the delta disk, and if the data does not exist in the delta disk file, then check for it in the base virtual disk file, resulting in multiple IO requests (that stem from a single original IO request from the application in the VM). Similarly, due to the particular organization or format of data within virtual disks and delta disks, certain layers of an IO stack may need to perform additional IO operations to update metadata stored in the virtual disk or delta disk file that, for example, stores information on how to find data stored in the virtual disk file (e.g., in the event the IO request is a request to write data into a virtual disk file). Certain layers of the IO stack may conduct further IO operations to perform related additional tasks, such as "journaling" an IO request into a region of the virtual machine file system to maintain crash consistency, such as for backup and failover purposes. As should be recognized, all the additional IO operations that may be performed by various layers of the IO stack in order to simply execute a single IO request originating from an application in the VM can significantly slow the ultimate completion of an IO request due in part to the processing overhead that occurs with from such additional IO operations.

SUMMARY

According to one embodiment, a method for coalescing IO requests issued from a virtual machine to the IO stack of a hypervisor includes maintaining a queue in a layer of the IO stack of the hypervisor. The queue holds IO requests received from an upper layer of the IO stack without forwarding the IO requests down the IO stack, and the layer of the IO stack resides above a file system layer of the IO stack that manages storage of a virtual disk file corresponding to the virtual machine. At the layer, either an IO request is received from the upper layer of the IO stack, or a notification of a completion is received for certain IO requests that were previously transmitted by the layer down the IO stack. Upon receiving the IO request or the notification of completion, the layer determines whether any IO requests currently held in the queue should be transmitted down the IO stack based upon at least one condition. If the at least one condition is satisfied, then the layer combines any IO requests in the queue into at least one combined IO request to transmit down the IO stack.

The following detailed description and accompanying drawings provide a more detailed understanding of the nature and advantages of the present invention.

DETAILED DESCRIPTION

Figure 1:
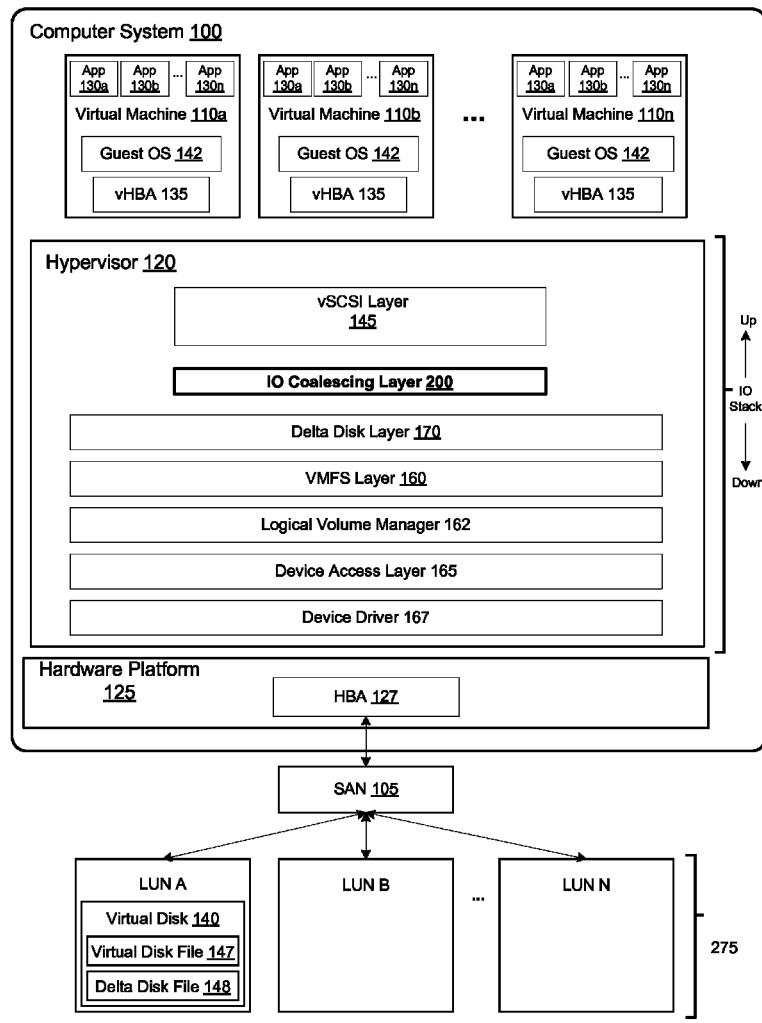
FIG. 1 illustrates a computer system configuration in which embodiments may be implemented.

FIG. 1 illustrates a computer system configuration in which embodiments may be implemented. The computer system configuration of FIG. 1 includes a computer system 100 that is connected to a storage area network (SAN) 105. Computer system 100 includes a hypervisor 120 that runs on top of hardware platform 125 and supports the operation of one or more virtual machines 110a, 110b . . . 110n. Hardware platform 125 includes a variety of hardware components to support the operations of a computer such as for example, a processor, memory, network card, local storage (e.g., hard drive, SSD, etc.) and a host bus adapter (HBA) 127 for communicating IO requests and receiving response to and from SAN 105.

Each of virtual machines 110 is capable of supporting a number of applications 130a, 130b ... 130n that operate on top of a guest OS 142 installed in the virtual machine. Each application 130, during its execution, may generate IO requests intended for a virtual disk 140 (or blocks of virtual disks 140) that is mounted by guest OS 142 to the virtual machine but is actually stored in SAN 105 (e.g., in one or more virtual disk files, such as base virtual disk file 147 and delta disk file 148). In one embodiment, such IO requests may be read requests and write requests that are, for example, ultimately formatted by guest OS 142 (or a storage device driver in guest OS 142), into SCSI command block requests intended for virtual disk 140 (although it should be recognized that other appropriate hardware connection interface standards known to those with ordinary skill in the art, including IDE, ATA, SAS and SATA may be used in alternative embodiments). In particular, each virtual machine 110 has a virtual hardware layer that includes, for example, a virtual host bus adaptor (vHBA) 135 that, from the perspective of guest OS 142 operates in an similar fashion to a physical HBA that transfers the IO requests (e.g., in SCSI block form) to a physical storage device. However, rather than transferring an IO request to a physical storage device, vHBA 135 forwards the IO request from the virtual machine into the IO stack of hypervisor 120 in order to ultimately reach virtual disk 140 stored within SAN 105. It should be recognized that the configuration of components in FIG. 1 is merely exemplary and that alternative embodiments that may practice the techniques described herein may utilize different components or configurations. For example, rather than accessing SAN 105 through HBA 127, an alternative embodiment may access a NAS through a NIC or may utilize local storage such as SSDs and the like.

In embodiments similar to that of FIG. 1, one of the first layers of the IO stack of hypervisor 120, is a virtual SCSI (vSCSI) layer 145 that, for example, receives an IO request from vHBA 135, in the form of a SCSI read or write command block. vSCSI layer 145 then converts the IO request (e.g., SCSI command block) into a form understood by IO coalescing layer 200. IO coalescing layer 200 generally performs coalescing operations on received IO requests in accordance with techniques described in further detail below before forwarding such IO requests (e.g., in a transformed state) further down the IO stack, for example, to a "delta disk" layer 170 in the embodiment of FIG. 1. Delta disk layer 170 receives an IO request from IO coalescing layer 200 and determines how such an IO request should be processed in view of the possibility that virtual disk 140 may actually comprise multiple virtual disk files (e.g., a base virtual disk file 147 and a delta disk file 148, etc.). For example, delta disk layer 170 may split a received IO read request into multiple IO read requests in order to first check delta disk file 148 of virtual disk 140 for the presence of the requested data before checking base virtual disk file 147 in the event delta disk file 148 does not contain the requested data. Delta disk layer 170 then further transforms such IO requests into file system operations that are understood by a virtual machine file system (VMFS) layer 160 and forwards such file system operations to VMFS layer 160. VMFS layer 160, in general, governs and manages how files (such as delta disk file 148 and base virtual disk file 147 for virtual disk 140) are created, used, and deleted on SAN 105. One example of an implementation of VMFS layer 160 is VMware's virtual machine file system, which is described in patent application Ser. No. 10/773,613 that is titled, "Multiple Concurrent Access To A File System" filed Feb. 4, 2004. VMFS layer 160, in turn, may convert the file system operations to volume block operations, and provide the volume block operations to a logical volume manager (LVM) 162. A LVM is typically implemented as an intermediate layer between the driver and conventional operating system file system layers, and, for example, supports volume oriented virtualization and management of logical unit numbers (LUNs) 275 that are exposed by SAN 105 and accessible through HBA 127. For example, multiple LUNs, such as LUNs 275 can be gathered and managed together as a volume under the control of LVM 162 for presentation to and use by VMFS layer 160 as an integral LUN. LVM 162 may then issue raw SCSI operations to device access layer 165 based on the LUN block operations. Device access layer 165 discovers SAN 105, and applies command queuing and scheduling policies to the raw SCSI operations. Device driver 167 understands the input/output interface of HBA 127 interfacing with SAN 105, and sends the raw SCSI operations from device access layer 165 to HBA 127 to be forwarded to SAN 105. SAN 105 receives the raw SCSI operations (i.e., LUN block level operations) and resolves them into the appropriate extents within the spindles of the disk array that are operated upon. It should be recognized that the various layers of the IO stack depicted in FIG. 1 and described in the foregoing are merely exemplary and different embodiments may have additional or alternative layers that perform similar or different functions. While the IO stack of FIG. 1 conceptually highlights certain layers in the IO stack that may be more relevant to the techniques described herein, it should be recognized that actual implementations may have other layers and levels within the IO stack that have not been discussed herein and that embodiments may not necessarily have all the layers discussed in FIG. 1. For example, in one embodiment of an IO stack, IO coalescing layer 200 may be implemented below a file system switch (FSS) layer and a file device switch (FDS) layer (e.g., known Linux or Unix file system layers). It should be further recognized that the various IO protocols (e.g., SCSI, etc.), file system structures (e.g., VMFS) and storage structures (e.g., SAN, etc.) described in FIG. 1 are merely exemplary and that other embodiments may utilize different protocols (e.g., IDE, etc.), file system structures (e.g., NFS, NTFS, etc.), storage structures (e.g., NAS, local SSD, virtual storage techniques, a combination of local and networks storage, etc.) and the like.

Figure 2:
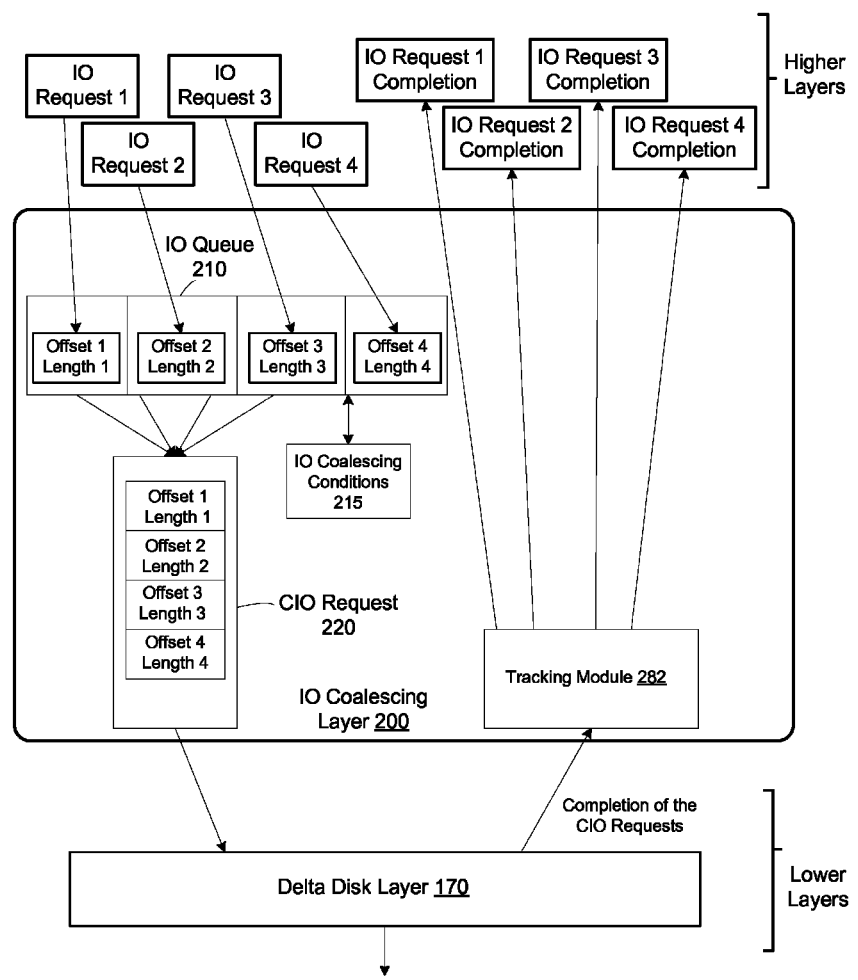
FIG. 2 illustrates further details of an IO coalescing layer according to one embodiment.

FIG. 2 illustrates further details of IO coalescing layer 200 according to one embodiment. In the embodiment of FIG. 2, IO coalescing layer 200 receives IO requests from vSCSI layer 145 in the form of a "scatter gather" list. That is, when vSCSI layer 145 receives a SCSI block command from vHBA 135 of VM 110a, vSCSI layer 145 may generate a "scatter gather list" data structure from the SCSI block command that includes, in part, an array or list of elements, wherein each element includes: (a) a reference, pointer, physical address or other address offset representing the location of a memory buffer for which at least part of the IO request is directed (e.g., read data from the virtual disk into such memory buffer, or write data from such memory buffer to the virtual disk, etc.), and (b) a length representing the size of data to be read from or written to such memory buffer. As depicted in the embodiment of FIG. 2, IO coalescing layer 200 utilizes an IO queue 210 to receive IO requests (e.g., in the form of scatter gather list data structures) from vSCSI layer 145. Based on a set of coalescing conditions 215 as further detailed below, IO coalescing layer 200 "coalesces" or combines certain IO requests received in IO queue 210 into a single combined "coalesced" IO (hereinafter, sometimes referred as "CIO") request 220 if one or more of the coalescing conditions 215 are currently satisfied. According to the embodiment of FIG. 2, a CIO request 220 is a single larger scatter gather list data structure that includes all the entries or elements of certain IO requests in IO queue 210, which may also be themselves scatter gather lists (e.g., although it should be recognized that alternative embodiments may utilize data structures to represent IO requests and CIO requests other than scatter gather lists). After generating CIO request 220, IO coalescing layer 200 transmits CIO request 220 further down the IO stack to delta disk layer 170 (and ultimately down to VMFS layer 160, LVM 162, device access layer 165, and device driver 167 for ultimate transmission to SAN 105).

As previously mentioned above, IO coalescing layer 200 utilizes coalescing conditions 215 to determine whether to coalesce one or more IO requests that are in IO queue 210 into CIO request 220 prior to transmitting CIO request 230 further down the IO stack. IO requests in IO queue 210 are described sometimes herein as either "pending" or "submitted" where "pending" means that the IO requests in the queue have not been coalesced, and "submitted" means that IO requests in the IO queue have been coalesced and transmitted down the IO stack, and that an acknowledgement of the completion of the CIO is being waited for. At the point when an acknowledgement of the completion of the CIO is received, then the IO requests for the CIO that was sent down the IO stack will be removed from IO queue 210. This distinction between pending IO request and submitted IO request is significant in that "submitted" IO requests prevent IO queue 210 from being considered empty (so new IOs are not sent down the IO stack immediately after being received but are pending), but do not count against the queue size limit of the IO queue being filled, where the queue size limit limits the number of "pending" IO requests.

Figure 3:
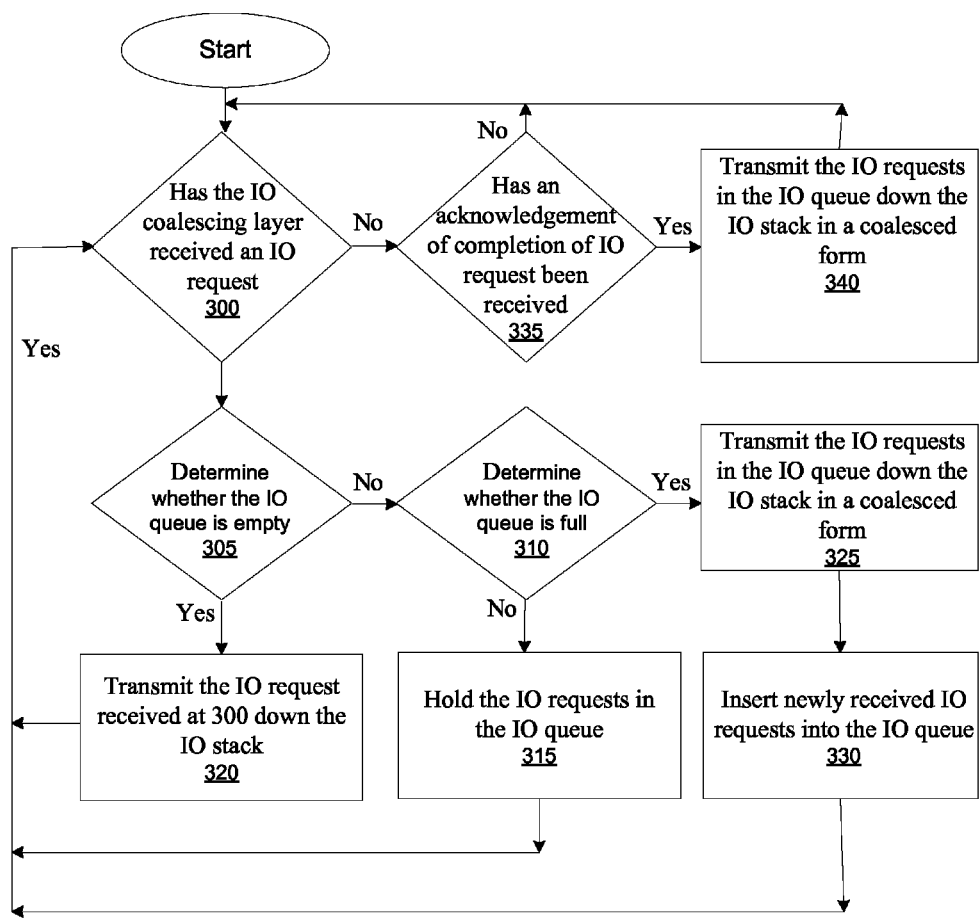
FIG. 3 depicts a flow chart of one embodiment of coalescing conditions that are used to determine whether to coalesce IO requests in an IO queue.

FIG. 3 depicts a flow chart of one embodiment of coalescing conditions that determine whether to coalesce IO requests in IO queue 210. If in step 300, IO coalescing layer 200 receives an IO request from vSCSI layer 145, then in step 305, IO coalescing layer 200 assesses whether IO queue 210 is currently empty. If IO queue 210 is not currently empty, then in step 310, IO coalescing layer 200 assesses whether IO queue 210 is currently full. If IO queue 200 is not full, then in step 315, IO coalescing layer 200 holds the IO request in IO queue 210 (i.e., does not further transmit the IO request down the IO stack) and returns back to step 300 (e.g., waiting for the occurrence of another event in the flow chart of FIG. 3). If, however, in step 305, IO queue 210 is empty, then in step 320, IO coalescing layer 200 forthwith transmits this received IO request down the IO stack to the delta disk layer 175 without generating a CIO request 230 or otherwise waiting for other IO requests to combine with the received IO request. The forthwith transmission of the IO request in step 320 ensures that a first IO request received at an empty IO queue 210 does unnecessarily stall in IO queue 210. That is, step 320 ensures that the received IO request is forthwith processed, and that an application running in guest OS 142 in VM 110a that issued the originating IO request does not unnecessarily "hang" due to the IO request being stalled within IO coalescing layer 200. If, for example, the flow of FIG. 3 did not include step 320 to deal with an empty IO queue 210 such that IO coalescing layer 200 actually held the first IO request received in an empty IO queue 210 in order to combine or coalesce with future IO requests, then an application that issues one IO request at a time and does not issue another IO request until completion of a prior IO request (e.g., an acknowledgment that the IO request has completed has been received by the application) might hang indefinitely waiting for the first IO request to complete (since such IO request would be held within IO coalescing layer 200).

Returning to step 310, if IO coalescing layer 200 determines that IO queue 210 is currently full, then in step 325, IO coalescing layer 200 will transmit all the current IO requests in IO queue 210 down the IO stack in a coalesced form, for example, as one or more coalesced CIO requests (e.g., thereby also creating space to place the newly received IO request into IO queue 210 in step 330). In one embodiment, IO coalescing layer 200 may combine all the current IO requests in IO queue 210 in a single CIO request. In an alternative embodiment, IO coalescing layer 200 may only coalesce read IO requests with other read IO requests and write IO requests with other write IO requests. For example, if IO queue 210 has a capacity of four and contains three write IO requests and one read IO request, then IO coalescing layer 200 coalesces the three write requests into a single CIO request, transmitting the CIO request down the IO stack but also transmits the single read IO request itself (which may be, for convenience purposes, also generally referred to herein as a CIO request even though it only contains a single IO request) down the IO stack as well. Accordingly, it should be recognized that based on the nature of the IO requests (e.g., all write IO requests, all read IO requests, or a mix of write and read IO requests) in IO queue 210, in certain embodiments, IO coalescing layer 200 may coalesce only a portion of the current IO requests in IO queue 210 into one or more CIO requests.

Returning to step 300, if IO coalescing layer 200 has not received an IO request from vSCSI layer 145, then in step 335, IO coalescing layer 200 assesses whether it has received an acknowledgement of a completion of a CIO request that IO coalescing layer 200 previously transmitted down the IO stack. If IO coalescing layer 200 does receive such an acknowledgement, then in step 340, IO coalescing layer 200 transmits all of the current IO requests (if any) in IO queue 210 down the IO stack in coalesced form (e.g., in one or more CIO requests, as previously discussed). As should be recognized, step 340, in combination with step 325, prevents IO coalescing layer 200 from indefinitely holding IO requests in IO queue 210, for example, if there are no further incoming IO requests.

It should be recognized that the foregoing coalescing conditions as depicted in the flow chart FIG. 3 are merely exemplary and that other coalescing conditions may supplement or replace those described above in alternative implementations. For example, in one such alternative embodiment, IO coalescing layer 200 may further implement a timer feature such that a timeout value is set when an IO request is initially placed in IO queue 210. Upon expiration of the timeout, IO coalescing layer 200 transmits the IO requests in IO queue 210 down the IO stack in coalesced form, as one or more CIO requests. Coalescing techniques similar to those described above in conjunction with the flow chart of FIG. 3 may ultimately increase the input/output operations per second ("IOPS") experienced by computer system 100. In particular, if layers of the IO stack residing below IO coalescing layer 200 (e.g., delta disk layer 170, etc.) perform better when they receive smaller numbers of larger IO requests, then the larger CIO requests issued by IO coalescing layer 300 (in contrast to the smaller IO requests received in IO queue 210) can improve IOPS. For example, in certain embodiments, delta disk layer 170, upon receiving an IO request (or CIO request) from the layer above it in the IO stack, may need to perform additional IO operations other than just the actual read or write operation that is the subject of the received IO request itself. That is, delta disk layer 170 may need to split a received IO request into multiple IO requests to check multiple virtual disk files (e.g., base virtual disk file, delta disk files, etc.), perform additional IO operations in order update metadata in virtual disk files due to how actual data is organized and stored in such virtual disk files (e.g., in "sparse" virtual disk file formats, etc.), perform additional IO in order to acquire locks on virtual disk files and other VMFS resources, for example to provide a capability to store or "journal" IO transactions to VMFS layer 160 for back-up or failover purposes, and the like. Such additional IO operations, if performed for each IO request received by delta disk layer 170, can significantly reduce IOPS, particularly if the IO requests are small and received by delta disk layer 170 at higher frequencies, thereby also increasing the potential for IO conflicts among the various IO requests (e.g., rejection of needed locks, etc.).

Embodiments may also enable the adjustment (e.g., either manually by an administrator or automatically or dynamically by an algorithm) of a variety of configuration settings relating to data structures and algorithms described herein in order to increase the performance of IO coalescing layer 200. One such configuration setting is the size of IO queue 210. For example, in one embodiment, a tracking module 282 (e.g., depicted in FIG. 2) in IO coalescing layer 200 may track the number of CIO requests that are completed (or alternatively, the number of corresponding original IO requests that made up the completed CIO requests) in a given time period (e.g., 750 msec, etc.). After the given time period, IO coalescing layer 200 may adjust the size of IO queue 210 to increase the number of IO requests that are processed in a subsequent given time period (e.g., again 750 msec). IO queue 210 may be configurable to a range of sizes, such as from one to thirty two. The size of IO queue 210 may initially have a default length of four (or other size, such as eight), and after the given time, IO coalescing layer 200 increases IO queue 210 to a size of eight. Thereafter, tracking module 282 will again determine the number of CIO requests (or corresponding original IO requests) completed in the subsequent given time period. Tracking module 282 then compares the number of CIO requests (or corresponding original IO requests) completed in the first given time period and the second given time period. If the number of CIO requests (or corresponding IO requests) completed in the second given time period increases, then IO coalescing layer 200 may again increases the size of IO queue 210 (e.g., according to any of a number of possible heuristics, such as doubling the size, increasing the size by a certain percentage, and the like) in an attempt to further increase the number of IO requests subsequently processed in the given time period (e.g., 750 msec). Alternatively, if the number of CIO requests (or corresponding IO requests) completed decreases, then IO coalescing layer 200 may decrease the size of IO queue 210 (e.g., according to a heuristic) in an attempt to recapture the prior increase in the number of IO requests processed in the prior given time period. This process of determining the number of IO requests processed in a given time period may be continually repeated in an effort to optimize a number of IO requests that are processed. In one embodiment, an initial increase in the size of IO queue 210 (e.g., the example increase from four to eight discussed above) may be random since IO queue 210 does not have trend data to heuristically assess whether the number of IO requests processed previously increased or decreased. It should be recognized that settings other than the size of IO queue 210 may be adjusted in the foregoing embodiments. For example, in certain embodiments, the time period (e.g., 750 msec) and the particular heuristic used to increase or decrease the size of IO queue 210 may be also adjusted, as well as the ability to turn on or off the general capability of tracking module 282 as described above.

According to one embodiment, tracking module 282 also waits for a "grace" period prior to allowing the transition of step 335 to step 340 (described above and shown in FIG. 3) to go forward after the queue size is increased thereby giving IO queue 210 a chance to fill up with a number of IO requests up to the new size of the IO queue. The grace period may begin after the queue size is increased (such as immediately after) and continues concurrently with the following time period (e.g., 750 msec) for a given percentage of time (e.g., 15%) of the following time period. If the tracking module does not wait for the grace period to complete prior to allowing the transition of step 335 to step 340, then the determination of the number of IO requests completed in the following time period that follows the increase in the queue size (e.g., from four to eight) may be skewed (i.e., incorrectly calculated). The grace period removes the potential skewing of the determination of the number of IO request that are completed in the following time period that follows the increase in the size of IO queue 210. The grace period may be empirically determined. According to one specific embodiment, the grace period is 5% to 15% of the given time period.

Other embodiments of tracking module 282 may also track the number IO requests processed within a number of successive given time periods (e.g., 20 successive given time periods of 750 msec, etc.) and the various sizes of IO queue 210 associated with each given time period. Tracking module can then analyze such tracked information to determine whether the number of IO requests processed in the given time periods have an approximate maximum and whether the maximum correlates with a given size of IO queue 210. For example, tracking module 282 might determine that a size of sixteen for IO queue 210 provides for an approximate maximum number of IO request to be processed within a given time period. If tracking module 282 determines that a specific size for IO queue 210 provides for an approximate maximum in the number of IO requests processed, then IO coalescing layer 200 may apply an "inertia" factor to the given time periods over which the size of IO queue 210 is changed. For example, instead of changing the size of IO queue 210 every given time period (e.g., 750 msec), the size of IO queue 210 may be changed every multiple of given time periods, such as over two given time periods (e.g., 1.5 sec), three given time periods (e.g., 2.25 sec), etc. Tracking module 282 may increase or decrease the multiple (e.g., 1, 2, 3, etc.) of given time periods based on the stability of the approximate maximum over time for a given size of IO queue 210. Applying the inertia factor to the given time periods provides that the size of IO queue 210 remains at a length where the number of IO requests processed remains at the approximate maximum.

IO coalescing layer 200 can further accelerate the size by which IO queue 210 is adjusted if tracking module 282 determines that the number of IO requests processed increased by a threshold amount between successive given time periods. For example, IO coalescing layer 200 might adjust the size of IO queue 210 by a factor of two if the increase in the number of IO requests processed between successive given time periods is less than the threshold amount, and might increase the size of IO queue 210 by a factor of two and half, three, etc. if the increase in number of IO request processed is equal to or greater than the threshold amount.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for coalescing IO requests issued from a virtual machine to an IO stack of a hypervisor, the method comprising:
   maintaining a queue in a layer of the IO stack of the hypervisor, wherein (i) the queue holds IO requests received from an upper layer of the IO stack without forwarding the IO requests down the IO stack until at least one condition is satisfied, and (ii) the layer of the IO stack resides above a file system layer of the IO stack that manages storage of a virtual disk file corresponding to the virtual machine;
   receiving, at the layer, either an a first IO request from the upper layer of the IO stack, the first IO request being issued by an application running on the virtual machine or a notification of a completion of certain IO requests previously transmitted by the layer down the IO stack;
   determining, upon the receiving of the first IO request, whether the queue is full;
   in response to determining that the queue is not full, holding the first IO request in the queue;
   in response to determining that the queue is full of additional IO requests, determining, upon the receiving, whether any combining two or more of the first and additional IO requests currently held in the queue should be transmitted down the IO stack into one or more coalesced IO requests according to one or more coalescing conditions based upon at least one condition; and
   transmitting the one or more coalesced IO requests combining any IO requests in the queue into at least one combined IO request to transmit down the IO stack if the at least one condition is satisfied.

2. The method of claim 1, wherein the one or more coalesced IO requests include a first coalesced IO request that combines all IO requests in the queue and the first request further comprising forwarding the received IO request down the IO stack if the IO queue is empty.

3. The method of claim 1, wherein further comprising: the at least one condition is satisfied if (i) the layer receives the receiving a notification of a completion of previous IO requests transmitted down the stack, and in response to the notification combining two or more of IO requests in the queue into one or more coalesced IO requests and transmitting the coalesced IO requests down the stack, or (ii) the layer receives the IO request and the IO queue is full.

4. The method of claim 1, wherein the at least one combined one or more coalesced IO requests comprises include a first combined coalesced IO request that combines all IO requests in the queue corresponding to read operations and a second combined coalesced IO request that combines all IO requests in the queue corresponding to write operations.

5. The method of claim 1, further comprising periodically adjusting a size of the queue.

6. The method of claim 5, wherein the size of the queue is adjusted based on comparing a rate of completion of transmitted IO requests in a prior period of time with a current rate of completion of transmitted IO requests in a current period of time.

7. The method of claim 5, further comprising evaluating whether the size of the queue should be adjusted in accordance with a configurable time period.

8. A non-transitory computer-readable storage medium comprising computer-executable instructions, wherein the instructions when executed in a computer that supports execution of a virtual machine and a virtual disk for coalescing IO requests issued from a virtual machine to an IO stack of a hypervisor, causes the computer to carryout the steps of:

maintaining a queue in a layer of the IO stack of the hypervisor, wherein (i) the queue holds IO requests received from an upper layer of the IO stack without forwarding the IO requests down the IO stack until at least one condition is satisfied, and (ii) the layer of the IO stack resides above a file system layer of the IO stack that manages storage of a virtual disk file corresponding to the virtual machine;

receiving, at the layer, either an a first an IO request from the upper layer of the IO stack, the first IO request being issued by an application running on the virtual machine or a notification of a completion of certain IO requests previously transmitted by the layer down the IO stack;

determining, upon the receiving of the first IO request, whether the queue is full;

in response to determining that the queue is not full, holding the first IO request in the queue;

in response to determining that the queue is full of additional IO requests, determining, upon the receiving, whether any combining two or more of the first and additional IO requests into one or more coalesced IO requests according to one or more coalescing conditions; currently held in the queue should be transmitted down the IO stack based upon at least one condition; and transmitting the one or more coalesced IO requests combining any IO requests in the queue into at least one combined IO request to transmit down the IO stack if the at least one condition is satisfied.

9. The non-transitory computer-readable storage medium of claim 8, wherein the one or more coalesced IO requests include a first coalesced IO request that combines all IO requests in the queue and the first request the instructions when executed in the computer further carryout the step of forwarding the received IO request down the IO stack if the IO queue is empty.

10. The non-transitory computer-readable storage medium of claim 9, wherein the instructions when executed further carryout the step of receiving a the at least one condition is satisfied if (i) the layer receives the notification of a completion of previous IO requests transmitted down the stack, and in response to the notification combining two or more of IO requests in the queue into one or more coalesced IO requests and transmitting the coalesced IO requests down the stack, or (ii) the layer receives the IO request and the IO queue is full.

11. The non-transitory computer-readable storage medium of claim 8, wherein the at least one combined one or more coalesced IO requests comprises include a first combined coalesced IO request that combines all IO requests in the queue corresponding to read operations and a second combined coalesced IO request that combines all IO requests in the queue corresponding to write operations.

12. The non-transitory computer-readable storage medium of claim 8, wherein the instructions when executed in the computer further carryout the step of periodically adjusting a size of the queue.

13. The non-transitory computer-readable storage medium of claim 12, wherein the size of the queue is adjusted based on comparing a rate of completion of transmitted IO requests in a prior period of time with a current rate of completion of transmitted IO requests in a current period of time.

14. The non-transitory computer-readable storage medium of claim 12, wherein the instructions when executed in the computer further carryout the step of evaluating whether the size of the queue should be adjusted in accordance with a configurable time period.

15. A computer system comprising:
a processor that is programmed to support the execution of a virtual machine on a hypervisor and configured for coalescing IO requests issued from the virtual machine to an IO stack of the hypervisor to carry out the steps of:

maintaining a queue in a layer of the IO stack of the hypervisor, wherein (i) the queue holds IO requests received from an upper layer of the IO stack without forwarding the IO requests down the IO stack until at least one condition is satisfied, and (ii) the layer of the IO stack resides above a file system layer of the IO stack that manages storage of a virtual disk file corresponding to the virtual machine;

receiving, at the layer, either an a first IO request from the upper layer of the IO stack, the first IO request being issued by an application running on the virtual machine or a notification of a completion of certain IO requests previously transmitted by the layer down the IO stack;

determining, upon the receiving of the first IO request, whether the queue is full;

in response to determining that the queue is not full, holding the first IO request in the queue;

in response to determining that the queue is full of additional IO requests, determining, upon the receiving, whether any combining two or more of the first and additional IO requests into one or more coalesced IO requests according to one or more coalescing conditions; currently held in the queue should be transmitted down the IO stack based upon at least one condition; and transmitting the one or more coalesced IO requests combining any IO requests in the queue into at least one combined IO request to transmit down the IO stack if the at least one condition is satisfied.

16. The computer system of claim 15, wherein the one or more coalesced IO requests include a first coalesced IO request that combines all IO requests in the queue and the first request the instructions when executed in the processor further carryout the step of forwarding the received IO request down the IO stack if the IO queue is empty.

17. The computer system of claim 16, wherein the instructions when executed further carryout the step of receiving a the at least one condition is satisfied if (i) the layer receives the notification of a completion of previous IO requests transmitted down the stack, and in response to the notification combining two or more of IO requests in the queue into one or more coalesced IO requests and transmitting the coalesced IO requests down the stack, or (ii) the layer receives the IO request and the IO queue is full.

18. The computer system of claim 15, wherein the at least one combined one or more coalesced IO requests comprises include a first combined coalesced IO request that combines all IO requests in the queue corresponding to read operations and a second combined coalesced IO request that combines all IO requests in the queue corresponding to write operations.

19. The computer system of claim 15, wherein the instructions when executed in the processor further carryout the step of periodically adjusting a size of the queue.

20. The computer system of claim 15, wherein the size of the queue is adjusted based on comparing a rate of completion of transmitted IO requests in a prior period of time with a current rate of completion of transmitted IO requests in a current period of time.

* * * * *